United States Patent
Garcia

(10) Patent No.: US 8,539,102 B2
(45) Date of Patent: Sep. 17, 2013

(54) DOWNLOADING A CODE IMAGE TO REMOTE DEVICES

(75) Inventor: Maurice Garcia, Levittown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 412 days.

(21) Appl. No.: 12/819,332

(22) Filed: Jun. 21, 2010

(65) Prior Publication Data

US 2011/0314107 A1    Dec. 22, 2011

(51) Int. Cl.
*G06F 15/173* (2006.01)

(52) U.S. Cl.
USPC .......................................................... 709/239

(58) Field of Classification Search
USPC ................. 709/201–203, 212, 217, 219, 220, 709/232, 246, 227, 228, 239
See application file for complete search history.

(56) References Cited

U.S. PATENT DOCUMENTS

| | | | | |
|---|---|---|---|---|
| 7,281,058 B1 * | 10/2007 | Shepherd et al. | ............ | 709/238 |
| 7,327,719 B2 * | 2/2008 | Hardisty | ...................... | 370/352 |
| 7,423,973 B2 * | 9/2008 | Chen et al. | .................... | 370/238 |
| 7,535,903 B1 * | 5/2009 | Patel | ............................. | 370/390 |
| 7,558,587 B2 * | 7/2009 | Albal et al. | ................... | 455/509 |
| 7,593,326 B2 * | 9/2009 | Collet et al. | .................. | 370/229 |
| 7,751,350 B1 * | 7/2010 | Pabst | ............................ | 370/285 |
| 7,885,199 B2 * | 2/2011 | Mooney et al. | ................ | 370/252 |
| 7,886,056 B2 * | 2/2011 | Collet et al. | .................. | 709/226 |
| 7,889,732 B2 * | 2/2011 | Bijwaard et al. | .............. | 370/390 |
| 7,953,457 B2 * | 5/2011 | Salomone et al. | ............. | 455/574 |
| 8,023,511 B2 * | 9/2011 | Komiya et al. | ................ | 370/390 |
| 8,150,993 B2 * | 4/2012 | Glasser et al. | ................ | 709/231 |
| 8,280,457 B2 * | 10/2012 | Salomone et al. | ............. | 455/574 |
| 2002/0012320 A1 * | 1/2002 | Ogier et al. | .................... | 370/252 |
| 2002/0062388 A1 * | 5/2002 | Ogier et al. | .................... | 709/238 |
| 2002/0095683 A1 * | 7/2002 | Watanabe | ........................ | 725/90 |
| 2003/0095504 A1 * | 5/2003 | Ogier | ............................ | 370/235 |
| 2003/0179742 A1 * | 9/2003 | Ogier et al. | .................... | 370/351 |
| 2005/0010963 A1 * | 1/2005 | Zeng et al. | ..................... | 725/131 |
| 2007/0067812 A1 * | 3/2007 | Watanabe | ........................ | 725/90 |
| 2008/0181138 A1 * | 7/2008 | Dalberg | ......................... | 370/256 |
| 2010/0020949 A1 * | 1/2010 | Robbins et al. | ............ | 379/93.01 |
| 2010/0082743 A1 * | 4/2010 | Zeng et al. | ..................... | 709/203 |

\* cited by examiner

*Primary Examiner* — Sargon Nano
(74) *Attorney, Agent, or Firm* — Banner & Witcoff, Ltd.

(57) ABSTRACT

A server downloads a code image to remote devices so that the remote devices are performing properly in accordance with an updated version of the code image. The server may include an application server that targets devices and informs the targeted devices about a multicasting session. The targeted devices subsequently join the multicast session supported by a multicasting server and extract the code image from the multicast session. After the multicast session has been completed, the downloading center polls the targeted devices to determine which devices have successfully downloaded the code image. The server may repeat the download to devices that did not successfully download the code image by subsequently scheduling a subsequent multicasting session or by individually sending the code image to the devices. Portions of the code image may be sent in multicasting messages based on a depth level and interval.

18 Claims, 8 Drawing Sheets

DOWNLOADING A CODE IMAGE TO REMOTE DEVICES

TECHNICAL FIELD

Aspects of the disclosure relate to downloading a code image to remote devices.

BACKGROUND

Content transmission and communication systems, e.g., high speed data and television content transmission systems, serve numerous users (often many thousands), in which each user has one or more devices (e.g., display devices, gateways, set top boxes or modems) to process signals at the user's premise. These devices often contain sophisticated software having very large code images that may be changed in order to provide new services and to enhance existing services. Downloading code images from a central facility to devices in the field may thus require a large investment in servers and cause a substantial increase of network congestion over a significant period of time in order to transmit a large amount of information. The time to deliver a code image may take several hours depending on the scheduling over a large network. If downloading to a device is not successful, a subsequent complete or partial download is scheduled. The complexity of the downloading process is further compounded by the large number of devices that may be involved. Consequently, the downloading process may result in a substantial amount of resources being diverted from other network needs.

BRIEF SUMMARY

The following presents a simplified summary of the disclosure in order to provide a basic understanding of some aspects. It is not intended to identify key or critical elements of the disclosure or to delineate the scope of the disclosure. The following summary merely presents some concepts of the disclosure in a simplified form as a prelude to the more detailed description provided below.

A server downloads a code image to remote devices so, for example, a the remote devices are performing in accordance with an updated version. The server may be an application server that targets devices and informs the targeted devices about a multicasting session that is supported by a multicasting server. The targeted devices subsequently join the multicast session and extract the code image from the multicast session. After the multicast session has been completed, the downloading center may poll the targeted devices to determine which devices have successfully downloaded the code image. The downloading center may download the code image to devices that did not successfully download the code image by subsequently scheduling a subsequent multicasting session or by individually sending the code image to the devices. The downloading center may determine whether to reschedule a multicasting session or whether to use unicast transmission based on a percentage of devices that have successfully downloaded the code image.

In another aspect of the disclosure, a code image may be sent in multicast messages based on a depth level and interval, where the depth level sets the size of a transmitted portion of the code image and the interval sets the number of repeats for transmitting each portion. The depth level and the interval may be set to predetermined values or may be dynamically determined based on a transmission metric.

Other embodiments can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed and claimed herein as well.

The details of these and other embodiments are set forth in the accompanying drawings and the description below. Other features and advantages of the disclosure will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

Traditional systems may download a code image (e.g., a stored representation of instructions that may be executed) to a remote device by transmitting a file in a data carousel using a multicast stream (e.g., broadcast method). Other traditional systems may use a file transfer protocol (FTP) to send a file to the remote device (e.g., unicast method). One known protocol is trivial file transfer protocol (TFTP), which typically uses a small file transfer size (typically less than 1 Mbyte). The broadcast method is typically proprietary per vendor implementation and is not standardized. However, while the unicast method may be standardized, it often results in substantial network congestion.

Aspects of the disclosure enable the time to upgrade a large network of devices to be reduced. In contrast, for example, it may require six to twelve months to complete firmware upgrades for a television content transmission system having a total population with millions of subscribers. Consequently, the potential for saving time and resources is substantial for network upgrades.

Figure 1:
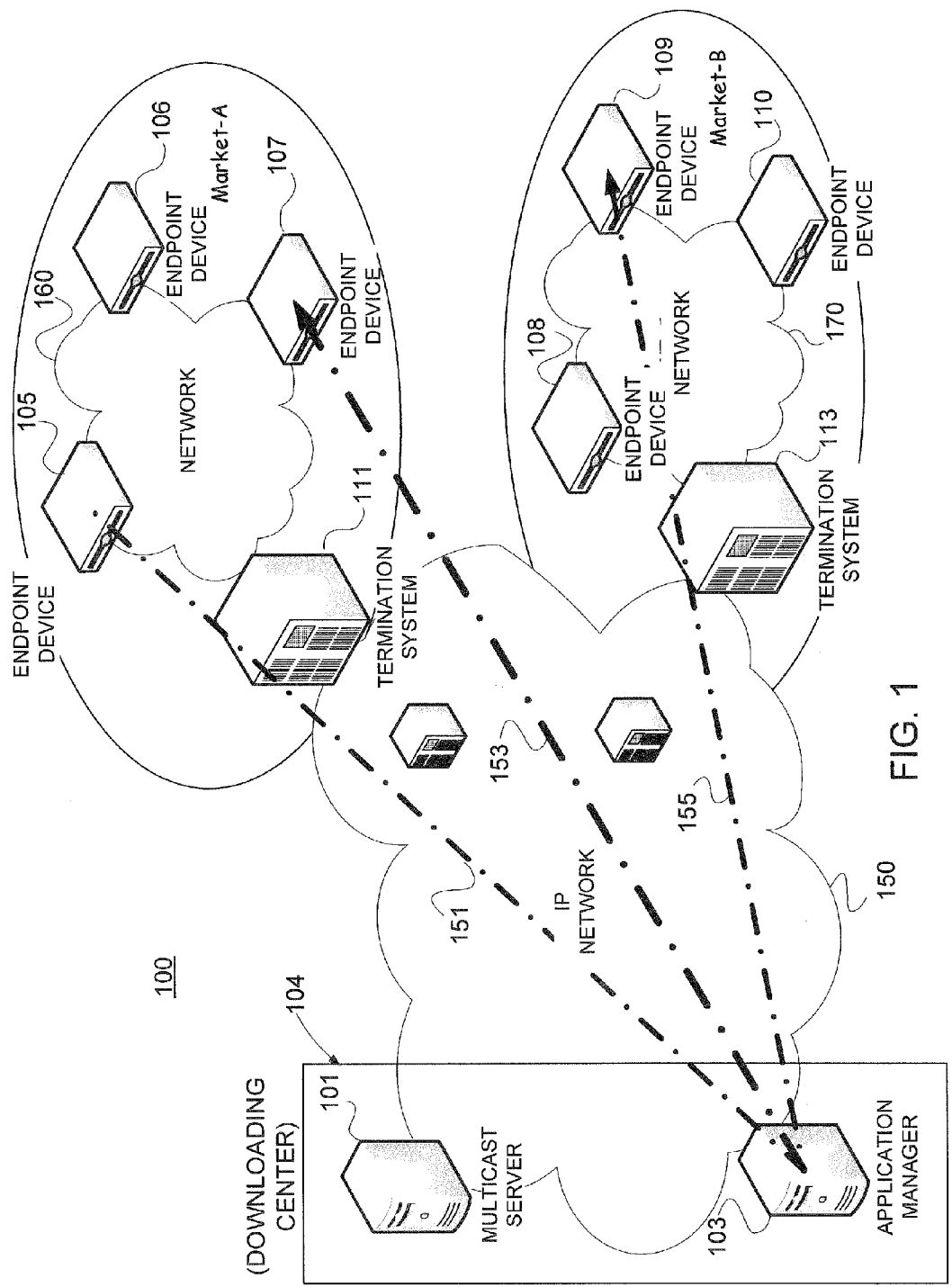
FIG. 1 shows an application manager in accordance with various aspects of the disclosure.
Figure 2:
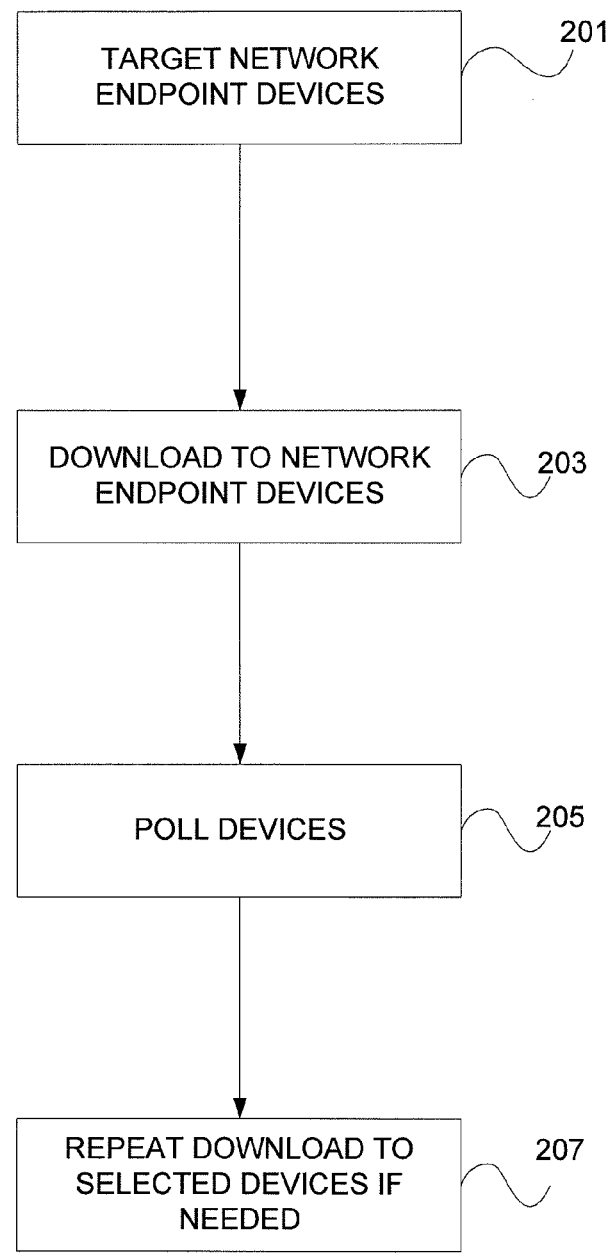
FIG. 2 shows a flow diagram for a procedure for downloading code images in accordance with aspects of the disclosure.

FIG. 1 shows system 100 in which downloading center 104 transmits an updated code image to remote devices for use, such as execution. As shown in FIG. 1, downloading center 104 includes application manager 103 and server 101, which may be a multicast server. Application manager (AM) 103 targets network endpoint devices 105-110 (e.g., display devices, mobile devices, gateways, set-top boxes (STBs), cable modems (CMs), cable modem termination systems (CMTSs), and routers) for downloading and subsequently may instruct devices 105-110 to join a multicast session in accordance with various aspects of the disclosure. (While the example shown in FIGS. 1 and 2 only depict downloading to devices 105, 107, and 109, embodiments typically support downloading a code image to hundreds or even thousands of devices during a multicast session.) Application manager 103 directs server 101 to download the code image in a multicast session as shown in FIG. 2 as discussed below. Referencing FIG. 1 server 101 accesses the code image in order to transmit the multicast session stream through Internet Protocol (IP) network 150. In the embodiment shown in FIG. 1, for example, IP network 150 may comprise one or more regional networks.

In order to establish a multicast session, application manager 103 may send unicast messages (e.g., using Simple Network Management Protocol (SNMP)) to targeted devices 105, 107, and 109 over communication lines 151, 153, and 155, respectively. The messages may be sent through a network 150, such as a wired or wireless IP network 150, termination systems 111 and 113, and networks 160 and 170 in order to instruct devices 105, 107, and 109 to join that multicast session as will be further discussed with FIG. 2. According to some embodiments, networks 160 and 170 may comprise fiber optic, coaxial cable, wireless, satellite, or hybrid fiber coaxial (HFC) networks, which may support Internet Protocol (IP) or any other protocol. Networks 160 and 170 may be extensions of IP network 150. Application manager 103 may select the targeted device using different criteria. For example, a download session may target a particular device model that is concentrated in a geographical location. As another example, devices may be dispersed across different markets in order to balance the traffic during the download process so that any particular network is not excessively congested from the download.

System 100 may utilize a wireless communication channel in lieu of or in conjunction with a wired network to communicate with devices 105, 107, and 109.

Application manager 103 subsequently may inform multicast server 101 to transmit the code image to devices 105, 107, and 109 in the multicast session. After the download has completed for the multicast session, application manager 103 may poll devices 105, 107, and 109 to determine which devices have been successfully upgraded, for example. Application manager 103 may determine when to poll based on different criteria, including a predetermined time or a download session completion acknowledgment from multicast server 101.

In the example shown in FIG. 1, the remaining devices (e.g., devices 106, 108, and 110) may be provided with the code image in one or more separate multicast sessions. Also, while not shown explicitly, multicast server 101 may comprise one or more servers.

FIG. 2 shows flow diagram 200 for a procedure for downloading code images to network endpoint devices in accordance with aspects of the disclosure. In step 201, targeted network endpoint devices are selected. In step 203, the code image is transmitted to the targeted devices. In some embodiments, the targeted device may join a multicast session, in which the code image is transmitted to the targeted devices. In other embodiments, the network endpoint devices may be notified of a broadcast session, which does not require that the targeted device join a multicast group. Rather than exchanging multicast messaging between an endpoint device and a server, the network endpoint device may listen to the broadcast at the scheduled time as indicated in schedule information contained in a transmitted notification table from the server.

In step 205, each targeted devices may be polled to verify that the download was successful for the device. If not, the download can be repeated in step 207 by retransmitting the code image to the device. For example, the device can join a subsequent multicast session or the code image can be sent through unicast (direct) messaging.

Figure 3:
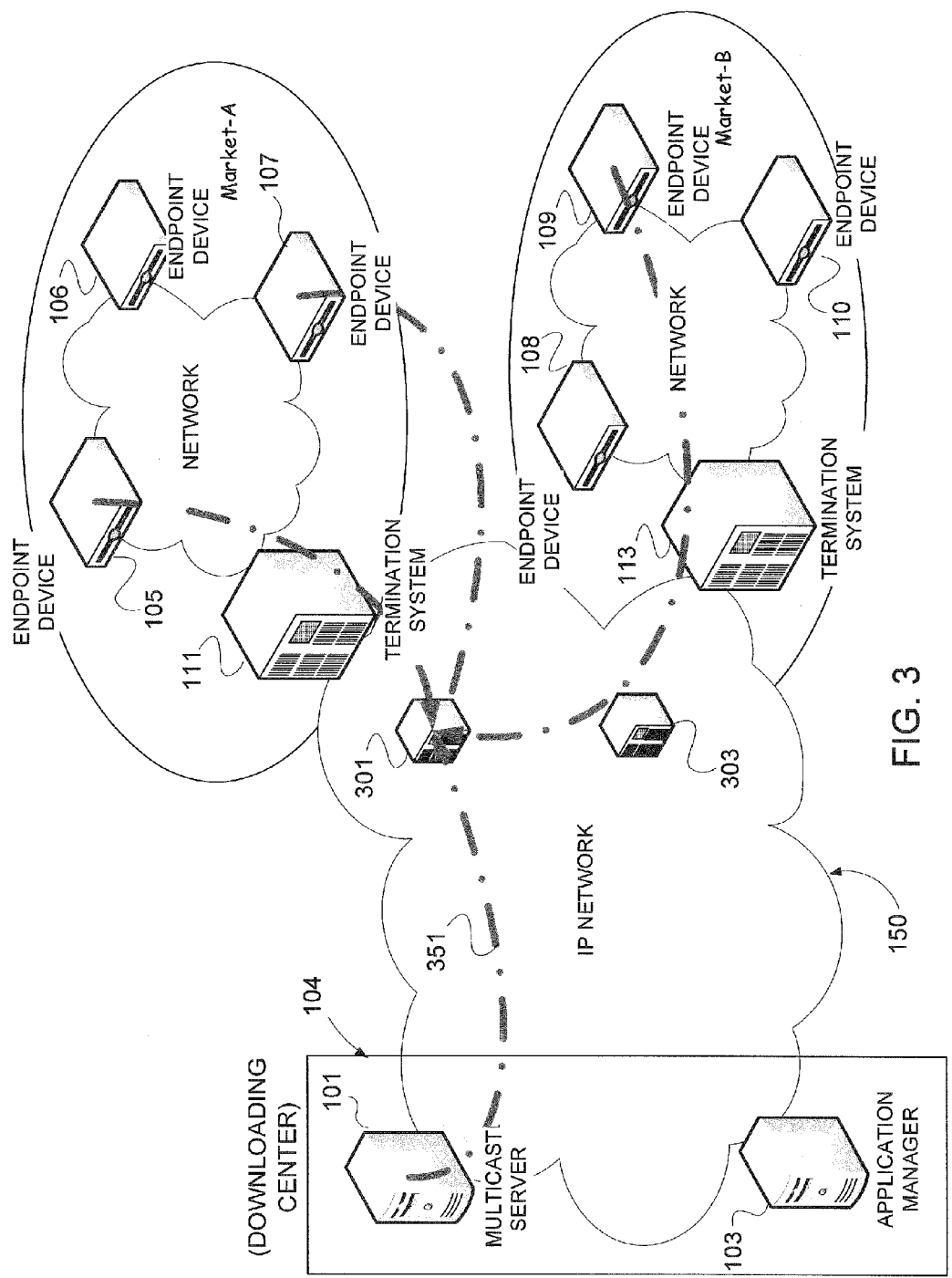
FIG. 3 shows a multicast server that supports downloading an image in accordance with aspects of the disclosure.

Referring to FIG. 3, multicast server 101 supports multicast session 351 through routers 301 and 303 and termination systems 111 and 113 for downloading a code image to devices 105, 107, and 109 in accordance with aspects of the disclosure. With some embodiments of the disclosure, multicast server 101 starts a multicast stream. Consequently, targeted devices 105, 107, and 109 join the multicast group using an appropriate protocol such as Internet Group Management Protocol (IGMP). Multicast server 101 then uses an IP multicast group to send the content of the code image, in which the group address provides the IP destination address in data packets. Devices 105, 107, and 109 use this group address to inform the network that they are interested in receiving packets that contain code image updates sent to that group. Multicast server 101 then downloads the code image by partitioning the code image and delivering the partitions using, for example, data packets (e.g., with User Datagram Protocol (UDP) or Transmission Control Protocol (TCP)).

Figure 4:
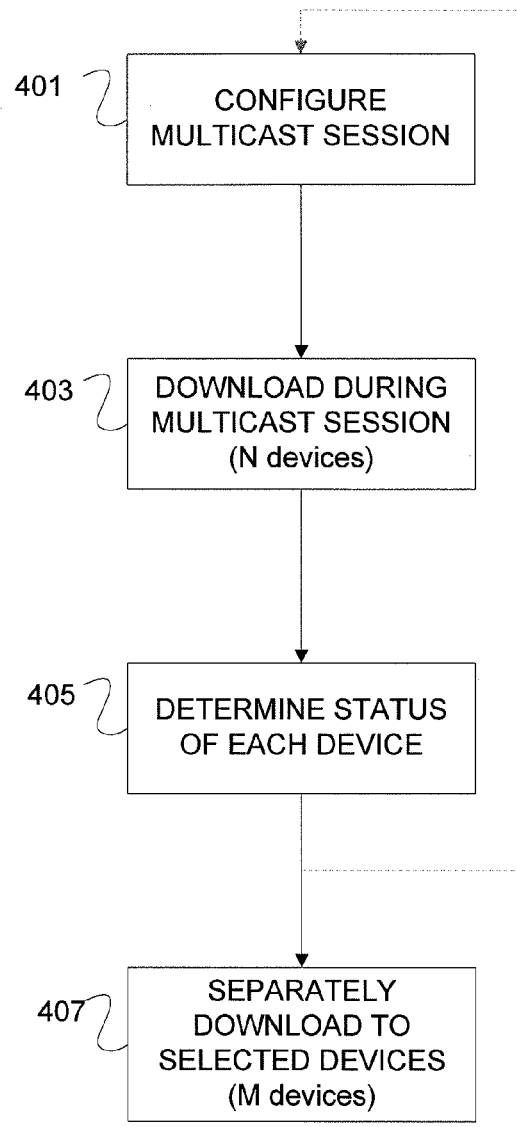
FIG. 4 shows a process for downloading an image to devices in accordance with various aspects of the disclosure.

FIG. 4 shows process 400 for downloading image code to targeted devices in accordance with various aspects of the disclosure. For example, process 400 may use a data structure that maps IP addresses to network endpoint devices in order to identify targeted devices. In step 401, application manager 103 identifies devices (e.g., display devices, mobile devices, gateways, set-top boxes 105, 107, and 109) for downloading and instructs the identified devices to join the multicast session that is subsequently initiated by multicast server 101. The multicast session is consequently configured by the targeted devices joining the multicast group. In step 403, multicast server 101 sends the content of the image code to the targeted devices using a multicast protocol, which may run on top of the user datagram protocol.

As will be discussed in further detail, the download status of the targeted devices is determined in step 405. Based on the download status, the code image may be separately downloaded to selected devices in step 407, or a subsequent multicast session may be scheduled for some or all of the targeted devices that did not successfully download the code image. Typically, the number (M) of devices that are separately downloaded is substantially smaller than the number (N) of devices that were previously downloaded in the previous multicast session so that the resulting traffic does not result in traffic congestion.

As discussed above, a targeted device may join a multicast group in order to receive the code image content. If the targeted device does not successfully download the code image based on a predetermined criterion, server 101 may directly communicate only with the targeted device using unicast messages. Moreover, with some embodiments a device may obtain code image content by receiving a broadcast transmission without joining a multicast group.

Figure 5:
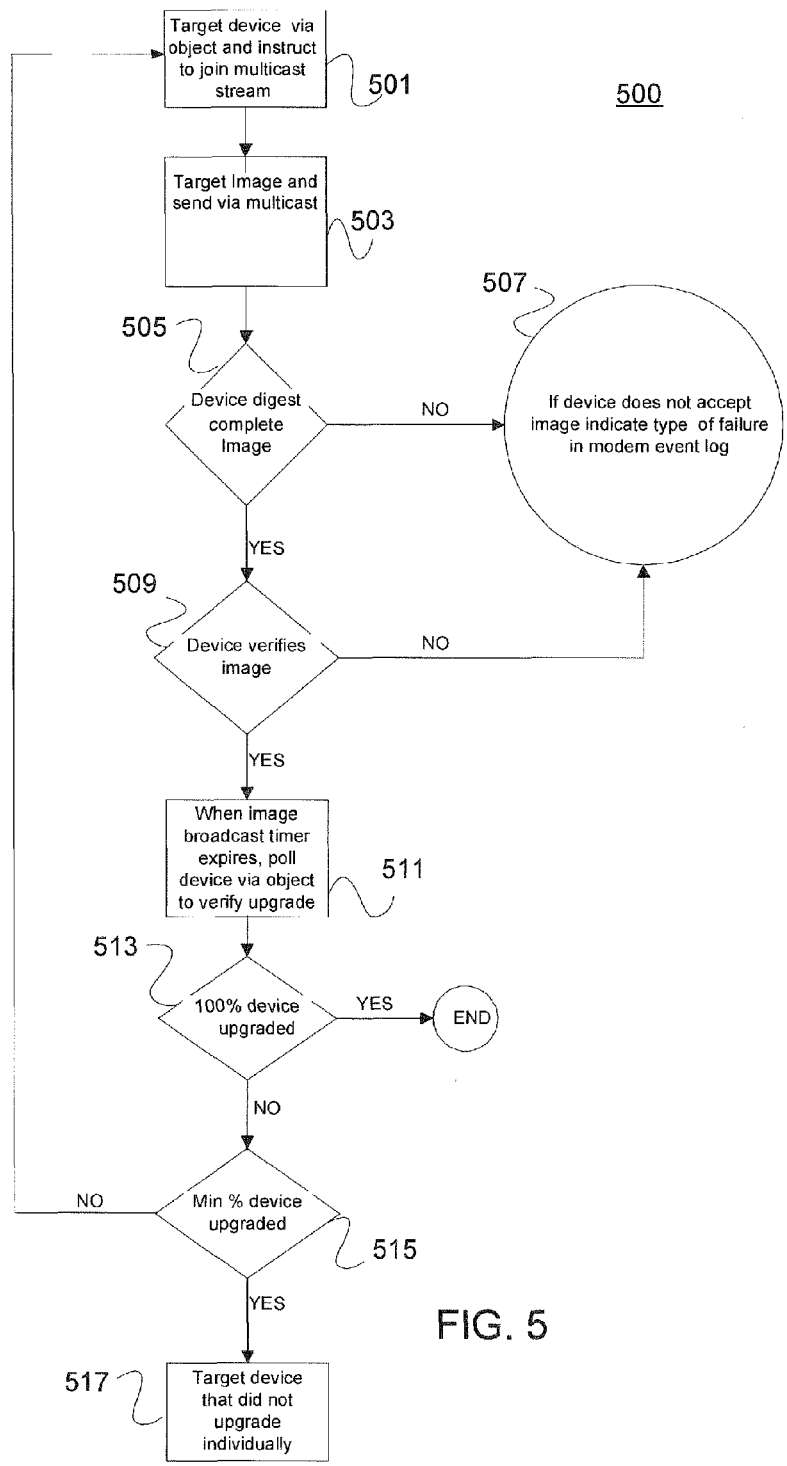
FIG. 5 shows a flow diagram for downloading an image to devices in accordance with aspects of the disclosure.

FIG. 5 shows flow diagram 500 for downloading a code image to targeted devices in accordance with aspects of the disclosure. In step 501, application manager 103, determines the targeted devices and instructs those devices to join the multicast session (stream) that multicast server 101 is sending. In step 503, and as further discussed with FIG. 6, multicast server 503 sends multicast messages in the multicast stream to provide the code image to devices that joined the multicast session. In step 505, a targeted device processes (digests) the content of multicast messages to extract the code image. If the targeted device does not accept the code image in step 507, the device indicates so with a status indicator. For example, with some embodiments, the device sets a readable object such as a SNMP object to indicate the downloading status of the device. For example, Internet Engineering Task Group RFC 2669 (DOCSIS Cable Device MIB Cable Device Management Information Base for DOCSIS compliant Cable Modems and Cable Modem Termination Systems) specifies a procedure docsDevSwAdminStatus having a value equal to 1, 2, or 3 corresponding to "upgradeFromMgt", "allowProvisioningUpgrade", or "ignoreProvisioningUpgrade", respectively, to indicate the downloading status of the device. If a device has successfully received a code image, the device sets the object value to "ignoreProvisioningUpgrade." The device verifies the code image in step 409.

In step 511, after a predetermined time has expired, application server 103 polls the targeted devices to verify receipt of the code image upgrade. However, while the code image may be upgraded, some embodiments may download other versions of the code image. If all of the targeted devices successfully downloaded the code image, as determined by step 513, downloading process 500 terminates at step 519. Otherwise, step 515 determines whether at least a predetermined percentage of targeted devices successfully downloaded the code image. If not, a subsequent multicast session is scheduled for the devices that did not successfully download in the multicast session. However, if at least a predetermined percentage of the targeted devices successfully downloaded the code image, in step 417 application server 103 individually sends the code image to each device that did not successfully download in the multicast session using unicasting (e.g., TFTP or HTTP).

Figure 6:
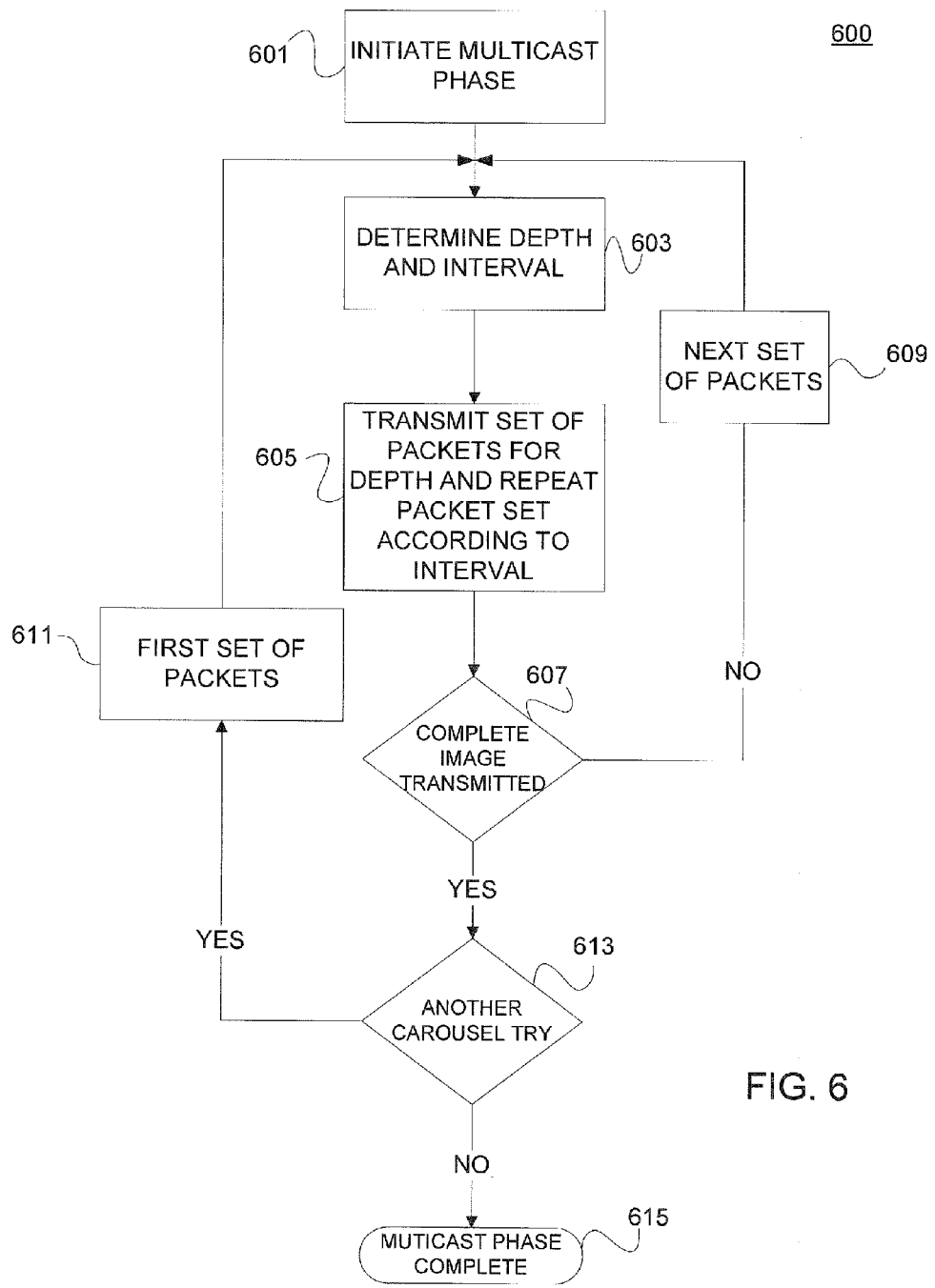
FIG. 6 shows a flow diagram for supporting a multicast session in accordance with aspects of the disclosure.

FIG. 6 shows a flow diagram for supporting multicast session 500 (corresponding to step 503 as shown in FIG. 5) in accordance with aspects of the disclosure. In step 601, multicasting server 101 initiates the multicast stream that contains the code image. The size of each portion is configured by the amount of code image content (depth) contained in each set of packets in step 603. Each portion of the code image is transmitted in the multicast stream in step 605. The depth may correspond to a number of packets containing a corresponding number of bytes, where the portion is repeated a number of times as determined by the interval. For example, if the interval is equal to 5, then a targeted device may have five chances to obtain a code image portion. When a portion has been repeated the configured number of times, multicast server 101 sends the next portion in step 609 until the complete code image has been transmitted as determined by step 607.

Process 600 further repeats the transmission of the complete code image, each corresponding to a carousel try in steps 613 and 611, where a carousel try corresponds to a repeat of the code image content in the transmitted data carousel. When all of the carousel tries have been completed, the multicast phase is terminated (corresponding to the completion of step 615).

The depth and interval may be set to predetermined values in process 503. However, with some embodiments, the depth and interval (determined in step 603) may be dynamically configured based on a transmission metric that is indicative of the communications conditions between multicasting server 101 and the targeted devices. For example, system 100 may utilize a monitoring device (not explicitly shown) that monitors a transmission metric (e.g., the error rate of the received communication signal) from multicasting server 101. Multicasting server 101 may consequently adjust the depth and interval (as shown in FIG. 6) based on the transmission metric during the multicast session. With some embodiments, devices 105, 107, and 109 may have monitoring capabilities for determining a transmission metric and for informing downloading center 104 about the transmission metric.

In some embodiments, devices 105, 107, and 109 provide a download status that is indicative of a percentage of the code image that was successfully downloaded to the device. For example, if a device could not download a portion of the code image during the multicast session, the device may cease downloading any subsequent portions of the code image during the multicast session. If the percentage exceeds a percentage threshold, downloading center 104 may subsequently download the remaining part of the code image in a unicast transmission to the device.

Figure 7:
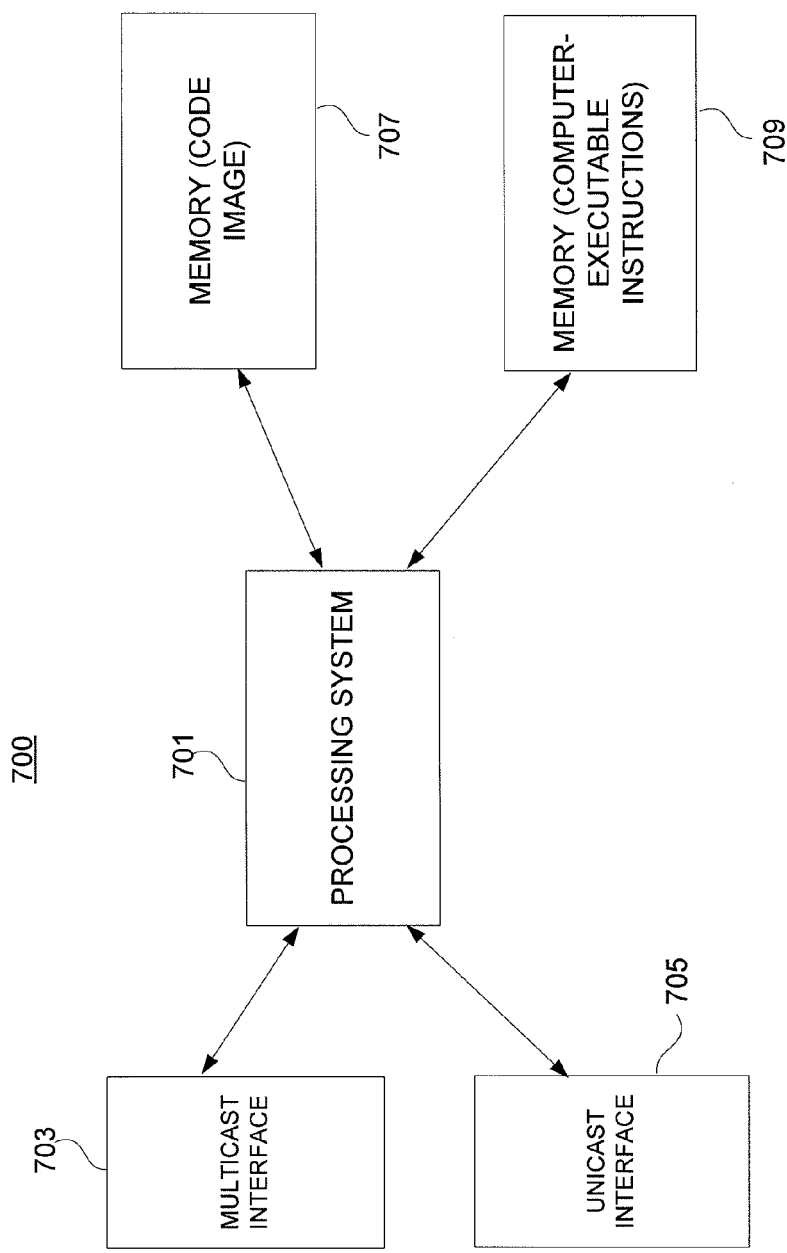
FIG. 7 shows an apparatus that supports downloading a code image in accordance with aspects of the disclosure.

FIG. 7 shows apparatus 700 that supports downloading a code image to a network endpoint device in accordance with aspects of the disclosure. With some embodiments, apparatus 700 supports the functionalities of application manager 103 and multicast server 101 as shown in FIGS. 1 and 2. Processor 701 may execute computer executable instructions from a computer-readable medium, e.g., memory 709 in order perform a data transmission process (any or all of the transmission processes described herein). Computer storage media may include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 701. The executable instructions may carry out any or all of the method steps described herein. With some embodiments, processor 701 may comprises one or more processing devices.

Memory 707 stores one or more versions of the image code for downloading to network endpoint devices, e.g., devices 105, 107, and 109.

Processor 701 performs the functionalities of application server 103 by sending unicast messages (e.g., SNMP and TFTP) through unicast interface 705 through converged regional network 150 and hybrid fiber cable networks 160 and 170. Processor 701 performs the functionalities of multicasting server 101 by sending multicasting messages through multicast interface 703 through networks 150, 160, and 170 in order to download the code image into devices 105, 107, and 109.

Figure 8:
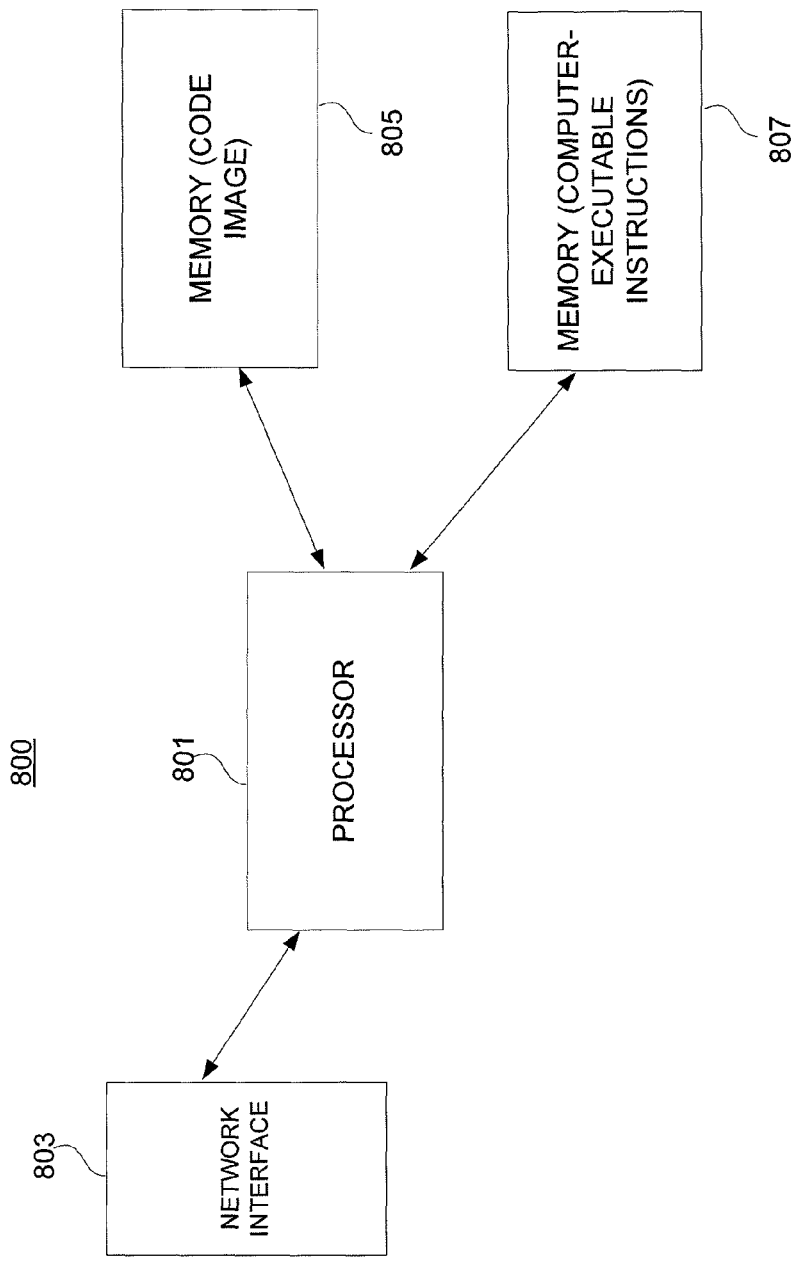
FIG. 8 shows an apparatus that supports downloading a code image in accordance with aspects of the disclosure.

FIG. 8 shows apparatus 800 that supports downloading a code image at a network endpoint device in accordance with aspects of the disclosure. With some embodiments, apparatus 800 supports the functionalities of devices 105 and 107 as shown in FIGS. 1 and 2. Processor 801 may execute computer executable instructions from a computer-readable medium, e.g., memory 807 in order perform a data transmission process (any or all of the transmission processes described herein). Memory 805 stores one or more versions of the image code that has been downloaded from multicast server 101.

Processor 801 performs the functionalities of a network endpoint device by receiving unicast (direct) messages (e.g., SNMP and TFTP) through network interface 803. Processor 801 also receives multicast messages through network interface 803 in order to download the code image to memory 805.

While the exemplary embodiments have been discussed in broad terms of a cable communications networking environment, the disclosure may be configured for other networking environments including telecommunications environments.

I claim:

1. A method, comprising:
   instructing a device to join a multicast session;
   downloading a file to a plurality of devices during the multicast session, wherein the device is one of the plurality of devices;
   determining a download status of the device;
   responsive to determining that the download status is indicative that the file successfully downloaded to more than a predetermined percentage of the plurality of devices during the multicast session and that the device did not successfully download the file, sending the file to the device;
   determining a depth level and an interval value;
   transmitting a portion of the file based on the depth level; and
   repeating transmitting the portion based on the interval value.

2. The method of claim 1, wherein the instructing comprises:
   sending the device a first message to join the multicast session,
   wherein the method further comprises receiving a second message from the device verifying that the device is able to join the multicast session.

3. The method of claim 1, further comprising:
   responsive to determining that less than the predetermined percentage of the plurality of devices successfully downloaded the file, scheduling a subsequent multicast session and downloading the file to at least some of the plurality of devices during the subsequent multicast session.

4. The method of claim 3, wherein at least said downloading and scheduling are performed by at least one computing device.

5. The method of claim 1, wherein said determining the download status comprises comparing a percentage of the plurality of devices that successfully downloaded the file with the predetermined percentage, and wherein said sending is selectively performed depending upon an outcome of said comparing.

6. The method of claim 1, wherein said sending comprises sending the file to the device during a unicast session with the device.

7. The method of claim 1, further comprising determining the portion of the file to have a size that is based on the depth level, and wherein said repeating transmitting comprises repeating transmitting the portion of the file a number of times that is based on the interval value.

8. A method, comprising:
   instructing a first device to join a multicast session;
   transmitting a file to a plurality of devices during the multicast session, wherein the first device is one of the plurality of devices; and
   performing at least one of the following:
     responsive to determining that the file successfully downloaded to more than a predetermined percentage of the plurality of devices during the multicast session and that the first device did not successfully download the file, transmitting the file to the first device, or
     responsive to determining that less than the predetermined percentage of the plurality of devices successfully downloaded the file, scheduling a subsequent multicast session and transmitting the file to at least some of the plurality of devices during the subsequent multicast session.

9. The method of claim 8, wherein said transmitting comprises sending the file to the first device during a unicast session with the first device.

10. The method of claim 8, wherein the file comprises a code image.

11. The method of claim 8, wherein at least said transmitting and scheduling are performed by at least one computing device.

12. The method of claim 8, wherein said determining comprises comparing a percentage of the plurality of devices that successfully downloaded the file with the predetermined percentage, and wherein said transmitting is selectively performed depending upon an outcome of said comparing.

13. The method of claim 8, wherein said transmitting comprises:
    determining a depth level and an interval value;
    transmitting a portion of the file based on the depth level; and
    repeating transmitting the portion based on the interval value.

14. The method of claim 13, further comprising determining the portion of the file to have a size that is based on the depth level, and wherein said repeating transmitting comprises repeating transmitting the portion of the file a number of times that is based on the interval value.

15. A method, comprising:
    transmitting a file to a plurality of devices including a first device during a multicast session;
    determining, by at least one computing device, which of the plurality of devices successfully downloaded the file during the multicast session; and
    depending upon an outcome of said determining, performing one of the following:
      if the file was successfully downloaded to more than a predetermined percentage of the plurality of devices during the multicast session, and if the first device did not successfully download the file during the multicast session, then the at least one computing device causing the file to be transmitted to the first device, or
      if the file was successfully downloaded to less than the predetermined percentage of the plurality of devices during the multicast session, then initiating a subsequent multicast session and transmitting the file during the subsequent multicast session.

16. The method of claim 15, wherein said causing the file to be transmitted comprises causing the file to be transmitted to the first device during a unicast session with the first device.

17. The method of claim 15, wherein the file comprises a code image.

18. The method of claim 15, wherein said transmitting comprises:
    determining a depth level and an interval value;
    transmitting a portion of the file based on the depth level; and
    repeating transmitting the portion based on the interval value.

* * * * *

UNITED STATES PATENT AND TRADEMARK OFFICE
CERTIFICATE OF CORRECTION

PATENT NO. : 8,539,102 B2
APPLICATION NO. : 12/819332
DATED : September 17, 2013
INVENTOR(S) : Maurice Garcia Page 1 of 1

It is certified that error appears in the above-identified patent and that said Letters Patent is hereby corrected as shown below:

In the Specification

Column 4, Detailed Description, Line 64:
Delete "503" and insert --101--

Column 5, Detailed Description, Line 15:
Delete "409." and insert --509.--

Column 5, Detailed Description, Line 17:
Delete "server" and insert --manager--

Column 5, Detailed Description, Line 29:
Delete "417" and insert --517--

Column 5, Detailed Description, Line 29:
Delete "server" and insert --manager--

Column 6, Detailed Description, Line 44:
Delete "server" and insert --manager--

Signed and Sealed this
Third Day of March, 2015

Michelle K. Lee
*Deputy Director of the United States Patent and Trademark Office*